United States Patent
Houghton, Jr.

(10) Patent No.: US 6,568,666 B2
(45) Date of Patent: May 27, 2003

(54) METHOD FOR PROVIDING HIGH VERTICAL DAMPING TO PNEUMATIC ISOLATORS DURING LARGE AMPLITUDE DISTURBANCES OF ISOLATED PAYLOAD

(75) Inventor: Worthington B. Houghton, Jr., Newport Beach, CA (US)

(73) Assignee: Newport Corporation, Irvine, CA (US)

( * ) Notice: Subject to any disclaimer, the term of this patent is extended or adjusted under 35 U.S.C. 154(b) by 51 days.

(21) Appl. No.: 09/881,397

(22) Filed: Jun. 13, 2001

(65) Prior Publication Data

US 2002/0190447 A1 Dec. 19, 2002

(51) Int. Cl.⁷ .................................. F16F 7/10
(52) U.S. Cl. ...................... 267/136; 188/378
(58) Field of Search ............ 267/136, 34, 35, 267/64.16, 64.21, 64.24, 64.27, 64.28; 188/378

(56) References Cited

U.S. PATENT DOCUMENTS

| | | |
|---|---|---|
| 1,143,165 A | 6/1915 | Begusch |
| 1,306,906 A | 6/1919 | Jacques, Sr. |
| 2,367,139 A | 1/1945 | Ress |
| 3,357,268 A | 12/1967 | Richter |
| 3,442,475 A | 5/1969 | Rivin |
| 3,460,786 A | 8/1969 | Rivin |
| 3,478,608 A | 11/1969 | Met |
| 3,533,012 A | 10/1970 | Johnson et al. |
| 3,565,515 A | 2/1971 | De Mey, II |
| 3,577,791 A | 5/1971 | Vanden Broek |
| 3,578,278 A | 5/1971 | Pickering |
| 3,601,476 A | 8/1971 | MacKenzie |
| 3,620,558 A | 11/1971 | MacMillan |
| 3,667,525 A | 6/1972 | Spieth |
| 3,751,025 A | 8/1973 | Beery et al. |
| 3,917,201 A | 11/1975 | Roll |
| 3,945,246 A | 3/1976 | Wadensten |
| 4,030,811 A | 6/1977 | Khoe et al. |

(List continued on next page.)

FOREIGN PATENT DOCUMENTS

| | | |
|---|---|---|
| CA | 2199423 | 3/1996 |
| GB | 2 124 402 A | 7/1982 |
| GB | 2 131 971 A | 6/1984 |
| JP | 03021894 | 1/1991 |
| JP | 08088167 | 9/1994 |
| JP | 09330875 | 6/1996 |
| JP | 10144601 | 11/1996 |

OTHER PUBLICATIONS

J. M. Kahn, C. A. Burrus, and G. Raybon, High–Stability 1.5 um External–Cavity Semiconductor Lasers for Phase–Lock Applications, Photonics Technology Letters, vol. 1. No. 7, Jul. 1989.

P. Zorabedian and W. R. Trutna, Jr., "Interference–filter–tuned, alignment–stabilized, semiconductor external–cavity laser", 1988, Optical Society of America.

A. Schremer and C. L. Tang, "Single–Frequency tunable external–cavity semiconductor laser using an electro–optic birefringent modulator", Appl. Phys. Lett., vol. 55, No. 1, Jul. 3, 1989.

(List continued on next page.)

Primary Examiner—Christopher P. Schwartz
(74) Attorney, Agent, or Firm—Irell & Manella, LLP

(57) ABSTRACT

A vibration isolator with a flange that extends from a piston. The piston may be coupled to a housing by a diaphragm. The diaphragm and flange define a balancing chamber that is in fluid communication with a leveling port. The flange is separated from the housing by a gap that provides fluid communication between the balance chamber and an inner chamber within which the piston moves relative to the housing. The piston is coupled to a support plate that is attached to a payload. The leveling port may be coupled to a leveling valve that varies the pressure within the balancing chamber and inner chamber to compensate for a disturbance applied to the isolator. The flange will provide a force that is opposite to the movement of the piston. The counteracting force minimizes oscillations in the isolator caused by releveling the support plate.

13 Claims, 1 Drawing Sheet

U.S. PATENT DOCUMENTS

| | | |
|---|---|---|
| 4,065,203 A | 12/1977 | Goell et al. |
| 4,079,404 A | 3/1978 | Comerford et al. |
| 4,088,396 A | 5/1978 | Edelstein |
| 4,119,363 A | 10/1978 | Camlibel et al. |
| 4,144,504 A | 3/1979 | Leggett et al. |
| 4,164,363 A | 8/1979 | Hsu |
| 4,167,744 A | 9/1979 | Nyul |
| 4,199,222 A | 4/1980 | Ikushima et al. |
| 4,237,474 A | 12/1980 | Ladany |
| 4,268,113 A | 5/1981 | Noel, Jr. |
| 4,295,152 A | 10/1981 | Khoe et al. |
| 4,296,998 A | 10/1981 | Dufft |
| 4,316,678 A | 2/1982 | F'Geppert |
| 4,332,469 A | 6/1982 | Wendland |
| 4,350,867 A | 9/1982 | Kinoshita et al. |
| 4,355,323 A | 10/1982 | Kock |
| 4,357,072 A | 11/1982 | Goodfellow et al. |
| 4,387,956 A | 6/1983 | Cline |
| 4,403,243 A | 9/1983 | Hakamada |
| 4,435,037 A | 3/1984 | Abramson et al. |
| 4,469,399 A | 9/1984 | Cowen et al. |
| 4,469,929 A | 9/1984 | Rosen et al. |
| 4,479,698 A | 10/1984 | Landis et al. |
| 4,500,165 A | 2/1985 | Scholl et al. |
| 4,506,108 A | 3/1985 | Kersch et al. |
| 4,523,802 A | 6/1985 | Sakaguchi et al. |
| 4,523,810 A | 6/1985 | Goss et al. |
| 4,525,659 A | 6/1985 | Imahashi et al. |
| 4,550,410 A | 10/1985 | Chenausky et al. |
| 4,615,031 A | 9/1986 | Eales et al. |
| 4,623,220 A | 11/1986 | Grabbe et al. |
| 4,647,147 A | 3/1987 | Pikulski et al. |
| 4,647,331 A | 3/1987 | Koury, Jr. et al. |
| 4,657,429 A | 4/1987 | Morris |
| 4,664,732 A | 5/1987 | Campbell et al. |
| 4,673,244 A | 6/1987 | Miles |
| 4,673,245 A | 6/1987 | Kling et al. |
| 4,677,290 A | 6/1987 | Mitch |
| 4,678,271 A | 7/1987 | Beaulieu |
| 4,679,908 A | 7/1987 | Goodwin |
| 4,701,013 A | 10/1987 | Jurczyszyn et al. |
| 4,702,556 A | 10/1987 | Ishii et al. |
| 4,708,429 A | 11/1987 | Clark et al. |
| 4,714,315 A | 12/1987 | Krause |
| 4,720,163 A | 1/1988 | Goodwin et al. |
| 4,746,195 A | 5/1988 | Auracher et al. |
| 4,747,657 A | 5/1988 | Chaoui et al. |
| 4,748,632 A | 5/1988 | Preston |
| 4,759,600 A | 7/1988 | Caron et al. |
| 4,763,979 A | 8/1988 | Heywang |
| 4,767,174 A | 8/1988 | Carenco et al. |
| 4,773,730 A | 9/1988 | Sedlmayr |
| 4,779,946 A | 10/1988 | Pimpinella et al. |
| 4,779,959 A | 10/1988 | Saunders |
| 4,782,223 A | 11/1988 | Suzuki |
| 4,787,691 A | 11/1988 | Lorenzo et al. |
| 4,800,262 A | 1/1989 | Lentine |
| 4,807,750 A | 2/1989 | Ryder et al. |
| 4,823,220 A | 4/1989 | Milster et al. |
| 4,837,768 A | 6/1989 | Schmid |
| 4,842,397 A | 6/1989 | Eisler |
| 4,850,261 A | 7/1989 | Greene |
| 4,850,671 A | 7/1989 | Finzel |
| 4,854,667 A | 8/1989 | Ebata et al. |
| 4,913,527 A | 4/1990 | Jessop |
| 4,914,867 A | 4/1990 | Saito et al. |
| 4,915,482 A | 4/1990 | Collins et al. |
| 4,916,635 A | 4/1990 | Singer et al. |
| 4,938,564 A | 7/1990 | Romero |
| 4,966,474 A | 10/1990 | Geiger |
| 4,978,910 A | 12/1990 | Knox et al. |
| 4,988,159 A | 1/1991 | Turner et al. |
| 4,988,165 A | 1/1991 | Ishii et al. |
| 5,000,415 A | 3/1991 | Sandercock |
| 5,044,719 A | 9/1991 | Nakamura |
| 5,058,124 A | 10/1991 | Cameron et al. |
| 5,058,868 A * | 10/1991 | Sirven .................. 267/259 |
| 5,062,012 A | 10/1991 | Maeda et al. |
| 5,068,749 A | 11/1991 | Patel |
| 5,077,747 A | 12/1991 | Hemmer et al. |
| 5,132,824 A | 7/1992 | Patel et al. |
| 5,138,496 A | 8/1992 | Pong |
| 5,140,470 A | 8/1992 | Luecke |
| 5,146,552 A | 9/1992 | Hodge |
| 5,150,236 A | 9/1992 | Patel |
| 5,172,160 A | 12/1992 | Van Eijk et al. |
| 5,179,618 A | 1/1993 | Anton |
| 5,183,350 A | 2/1993 | Kramer |
| 5,189,725 A | 2/1993 | Bensel, III et al. |
| 5,191,587 A | 3/1993 | Hanson et al. |
| 5,194,993 A | 3/1993 | Bedzyk |
| 5,214,735 A | 5/1993 | Henneberger et al. |
| 5,218,258 A | 6/1993 | Shirasu et al. |
| 5,218,610 A | 6/1993 | Dixon |
| 5,219,051 A | 6/1993 | Davis |
| 5,251,863 A | 10/1993 | Gossman et al. |
| 5,285,995 A | 2/1994 | Gonzalez et al. |
| 5,289,559 A | 2/1994 | Wilson |
| 5,300,755 A | 4/1994 | Nishitani et al. |
| 5,311,278 A | 5/1994 | Rosencher |
| 5,319,435 A | 6/1994 | Melle et al. |
| 5,321,539 A | 6/1994 | Hirabayashi et al. |
| 5,327,061 A | 7/1994 | Gullapalli |
| 5,337,383 A | 8/1994 | DeAngelis et al. |
| 5,367,140 A | 11/1994 | Jonaneh et al. |
| 5,410,145 A | 4/1995 | Coroy |
| 5,428,225 A | 6/1995 | Silva et al. |
| 5,428,635 A | 6/1995 | Zhiglinsky et al. |
| 5,434,944 A | 7/1995 | Kerry et al. |
| 5,434,945 A | 7/1995 | Burek et al. |
| 5,446,519 A | 8/1995 | Makinouchi |
| 5,463,647 A | 10/1995 | Pan |
| 5,469,265 A | 11/1995 | Measures et al. |
| 5,499,261 A | 3/1996 | Welch et al. |
| 5,502,598 A | 3/1996 | Kimura et al. |
| 5,528,718 A | 6/1996 | Ray et al. |
| 5,530,547 A | 6/1996 | Arnold |
| 5,530,785 A | 6/1996 | Sakamoto et al. |
| 5,553,186 A | 9/1996 | Allen |
| 5,563,972 A | 10/1996 | Krausse et al. |
| 5,564,537 A | 10/1996 | Shoureshi |
| 5,570,444 A | 10/1996 | Janssen et al. |
| 5,581,077 A | 12/1996 | Chirovsky et al. |
| 5,598,500 A | 1/1997 | Crespel et al. |
| 5,603,387 A | 2/1997 | Beard et al. |
| 5,617,501 A | 4/1997 | Miller et al. |
| 5,619,609 A | 4/1997 | Pan et al. |
| 5,638,267 A | 6/1997 | Singhose et al. |
| 5,638,482 A | 6/1997 | Winterhoff et al. |
| 5,653,317 A | 8/1997 | Wakui |
| 5,655,045 A | 8/1997 | Morlion et al. |
| 5,660,255 A | 8/1997 | Schubert et al. |
| 5,668,906 A | 9/1997 | Yamamura et al. |
| 5,673,350 A | 9/1997 | Song et al. |
| 5,689,607 A | 11/1997 | Vincent et al. |
| 5,717,804 A | 2/1998 | Pan et al. |
| 5,725,066 A | 3/1998 | Beard et al. |
| 5,737,132 A | 4/1998 | Luecke et al. |
| 5,745,633 A | 4/1998 | Giebel et al. |
| 5,748,821 A | 5/1998 | Schempp et al. |
| 5,751,877 A | 5/1998 | Ishizaka et al. |

| | | |
|---|---|---|
| 5,757,561 A | 5/1998 | Sechrist et al. |
| 5,758,004 A | 5/1998 | Alarcon et al. |
| 5,761,360 A | 6/1998 | Grois et al. |
| 5,765,800 A | 6/1998 | Watanabe et al. |
| 5,774,614 A | 6/1998 | Gilliland et al. |
| 5,779,010 A * | 7/1998 | Nelson ............... 188/378 |
| 5,793,920 A | 8/1998 | Wilkins et al. |
| 5,793,921 A | 8/1998 | Wilkins et al. |
| 5,794,912 A | 8/1998 | Whittaker et al. |
| 5,812,958 A | 9/1998 | Mayama |
| 5,823,307 A | 10/1998 | Schubert et al. |
| 5,825,558 A | 10/1998 | Farmiga et al. |
| 5,852,519 A | 12/1998 | Do et al. |
| 5,880,894 A | 3/1999 | Blakley |
| 5,909,324 A | 6/1999 | Bryant et al. |
| 5,930,057 A | 7/1999 | Sechrist et al. |
| 5,941,508 A * | 8/1999 | Murata et al. ........... 267/64.17 |
| 5,941,920 A | 8/1999 | Schubert |
| 5,946,023 A | 8/1999 | Blanding |
| 5,963,695 A | 10/1999 | Joyce |
| 6,016,230 A | 1/2000 | Nunnally et al. |
| 6,022,005 A | 2/2000 | Gran et al. |
| 6,198,580 B1 | 3/2001 | Dallakian |
| 6,209,841 B1 | 4/2001 | Houghton, Jr. et al. |

OTHER PUBLICATIONS

M. W. Maeda, J. S. Patel, D. A. Smith, Chinlon Lin, M. A. Saifi, and A. Von Lehman, "An Electronically Tunable Fiber Laser with a Liquid–Crystal Etalon Filter as the Wavelength– Tuning Element", IEEE Photonics Technology Letters, vol. 2, No. 11, Nov. 1990.

Katsuhiko Hirabayashi, Hiroyuki Tsuda, and Takashi Kurokawa, "Tunable Liquid–Crystal Fabry–Perol Interferometer Filter for Wavelength–Division Multiplexing Communication Systems", Journal of Lightwave Technology, vol. 11, No. 12, Dec. 1993.

Stephen R. Mallison, "Wavelength–selective filters for single–mode fiber WDM systems using Fabry–Perot interferometers", Applied Optics, vol. 26, No. 3, Feb. 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid–Crystal Fabry–Perot Interferometer", IEEE Photonics Technology Letters, vol. 3. No. 6. Jun. 1991.

John R. Andrews, "Low Voltage Wavelength Tuning of an External Cavity Diode Laser Using a Nematic Liquid Crystal–Containing Birefringent Filert", IEEE Photonics Technology Letters. vol. 2, No. 5, May 1990.

N. A. Olsson and J. P. Van Der Ziel, "Performance Characteristics of 1.5–um External Cavity Semiconductor Lasers for Coherent Optical Communication", Journal Of Lightwave Technology, vol. LT–5. No. 4, Apr. 1987.

Hecht Optics Second Edition, Eugene Hecht, reprinted 1990, reference text, pp. 303 #368.

Rivin, Eugene I., "Vibration isolation of precision equipment", Precision Engineering, 1995, pp. 41–56, vol. 17.

"Marsh Mellow Springs Vibration Isolation Design Manual", 1998, Firestone Industrial Products Company.

Rivin, Eugene I., "Shaped Elastomeric Components for Vibration Control Devices", Sound and Vibration, Jul. 1999, pp. 18–23, vol. 33, No. 7.

* cited by examiner

METHOD FOR PROVIDING HIGH VERTICAL DAMPING TO PNEUMATIC ISOLATORS DURING LARGE AMPLITUDE DISTURBANCES OF ISOLATED PAYLOAD

BACKGROUND OF THE INVENTION

1. Field of the Invention

The present invention relates to pneumatic vibration isolators.

2. Background Information

Vibration isolators are used to isolate vibration and shock loads applied to a working surface. For example, vibration isolators typically support the table of semiconductor fabrication equipment to isolate shock and vibration that would otherwise be caused by transmission of vibration from the floor to the table through the table support.

Some vibration isolators contain a piston that moves within an air filled cylinder. For example, U.S. Pat. No. 3,784,146 issued to Matthews and U.S. Pat. No. 5,071,108 issued to Houghton disclose vibration isolators that contain a pneumatic piston which is coupled to a support plate by a plurality of cables. The support plate is typically attached to a payload such as a table. The support plate may have a shaft that extends down into a damping fluid. Horizontal movement of the payload and attached support plate may be damped by movement of the shaft within the damping fluid. The cables allow the support shaft to translate within the piston.

The vibration isolator may be coupled to an air leveling valve that can vary the air pressure within the isolator and compensate for large system disturbances. By way of example, the disturbance may be caused by removing or adding weight to the payload, which causes an immediate upward or downward movement of the support plate, respectively. The isolators are typically designed to provide a relatively high leveling gain and vertical damping to quickly compensate for the system disturbance. Unfortunately, the high leveling gain may cause system oscillation. The high vertical damping may degrade isolation efficiency.

BRIEF SUMMARY OF THE INVENTION

One embodiment of the present invention includes a vibration isolator with a flange that extends from a piston. The piston is coupled to a housing by a diaphragm. The diaphragm and flange define a balancing chamber that is in fluid communication with a leveling port. The flange is separated from the housing by a gap that provides fluid communication between the balance chamber and an inner chamber within which the piston moves relative to the housing.

DETAILED DESCRIPTION OF THE PREFERRED EMBODIMENT

Figure 1:
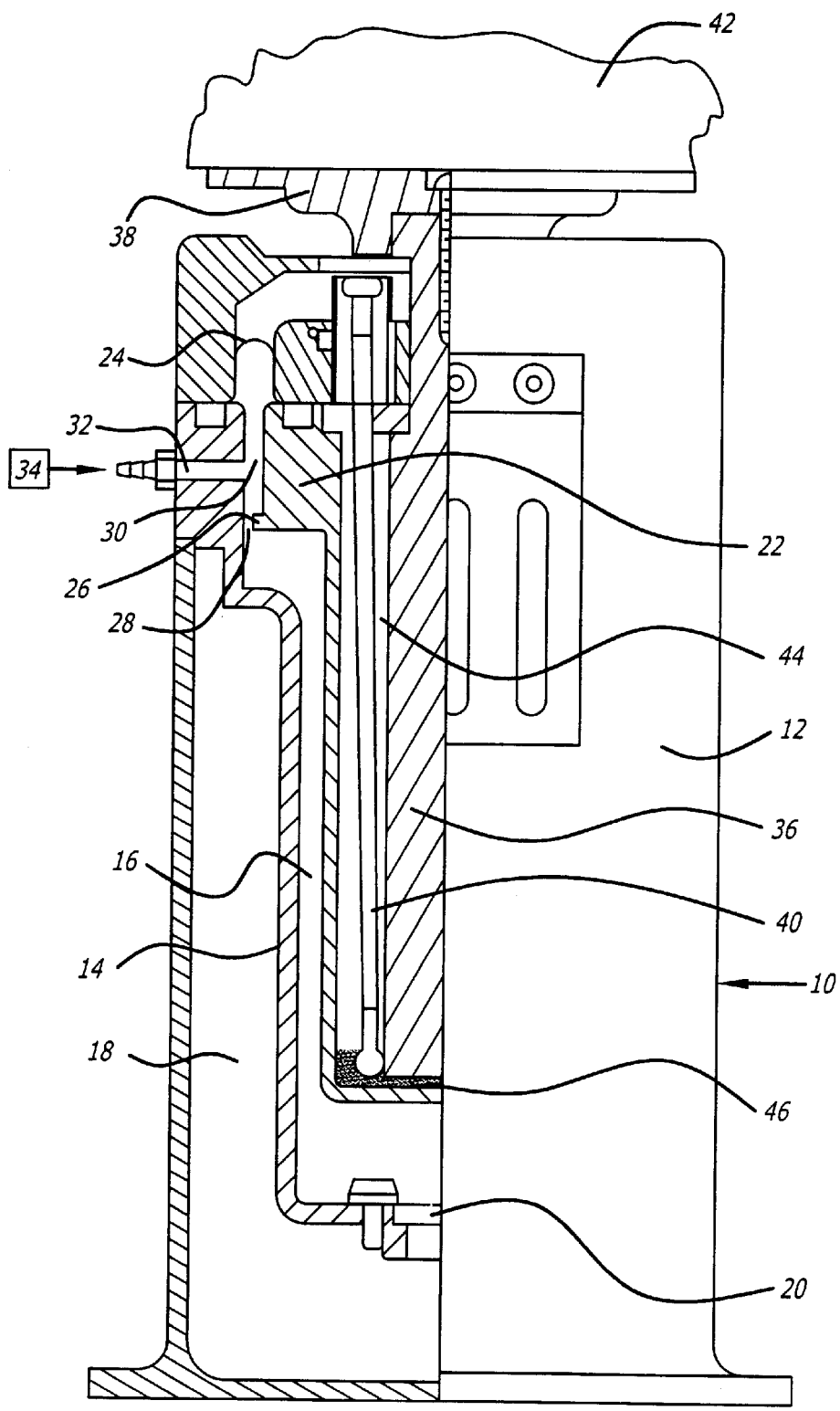
FIG. 1 is a cross-sectional view of an embodiment of a vibration isolator of the present invention.

The applicant discloses a vibration isolator with a flange that extends from a piston. The piston may be coupled to a housing by a diaphragm. The diaphragm and flange define a balancing chamber that is in fluid communication with a leveling port. The flange is separated from the housing by a gap that provides fluid communication between the balance chamber and an inner chamber within which the piston moves relative to the housing. The piston is coupled to a support plate that is attached to a payload. The leveling port may be coupled to a leveling valve that varies the pressure within the balancing chamber and inner chamber to compensate for a disturbance applied to the isolator. The flange will provide a force that is opposite to the movement of the piston. The counteracting force minimizes oscillations in the isolator caused by releveling the support plate.

Referring to the drawings more particularly by reference numbers, FIG. 1 shows an embodiment of a vibration isolator 10 of the present invention. The isolator 10 may include a housing 12 that contains an inner cylinder 14. The inner cylinder 14 includes a first inner chamber 16. The cylinder 14 is located within a second inner chamber 18 of the housing 12. A damping element 20 provides fluid communication between the first 16 and second 18 chambers.

Located within the first inner chamber 16 is a piston 22 that is coupled to the housing 12 by a diaphragm 24. The diaphragm 24 seals the first inner chamber 16 while allowing the piston 22 to move relative to the housing 12. The piston 22 has a flange 26 that is separated from the housing 12 by a gap 28. The gap 28 allows fluid communication between the first inner chamber 16 and a balancing chamber 30 defined by the flange 26 and the diaphragm 24. Although one flange 26 is shown and described, it is to be understood that the piston 22 may have a plurality of flanges 26. The isolator 10 has a leveling port 32 that is in fluid communication with the balancing chamber 30. The leveling port 32 is coupled to a leveling valve 34 that can be switched to increase, maintain or decrease the pressure within the chambers 16, 18 and 30 of the isolator 10. The leveling valve 34 may be coupled to a controller (not shown) that senses large disturbances in the system and switches the valve 34 to compensate for the disturbances, or may be mechanically actuated by a sense arm (not shown) which contacts the payload 42 or support plate 38.

The piston 22 may be coupled to the support post 36 of a support plate 38 by a plurality of cables 40. The support plate 38 may be attached to a payload 42. By way of example, the payload 42 may be an optical bench or the base of an x-y table. The piston 20 may include an inner cavity 44 that contains a damping fluid 46. Horizontal shock and/or vibrational movement of the payload 42 and support plate 38 may be damped by movement of the support post 36 within the damping fluid 46. The cables 40 allow the support shaft 28 to move within the inner cavity 44 of the piston 22.

In operation, the payload 42 may undergo a large downward disturbance wherein the leveling valve 34 increases the pressure within the balancing chamber 30. Initially the balancing chamber 30 has a higher pressure than the inner chamber 16. This high pressure within the balancing chamber 30 creates an upward force on the diaphragm 24 that will cause the piston 22 to move upward. The net force across the flange 26 is in a downward direction because the pressure within the balancing chamber 30 is higher than the inner chamber pressure. The downward force on the flange 26 counteracts the upward force on the diaphragm 24 and the upward force created within the inner chamber 16 on the bottom of the piston 22. The offsetting force reduces the bounce of the piston 22 and increases the stability of the isolator 18.

The gap 28 between the flange 26 and the housing 12 allows the pressure within the chambers 16 and 30 to equalize so that the flange 26 does not have a net downward force and the system can reach a level equilibrium. Likewise, when the pressure within the balancing chamber is decreased to offset an upward disturbance of the payload 42 the flange 26 will again provide a counteractive force to offset the downward movement of the piston 22 during the re-level sequence.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A vibration isolator, comprising:
   a housing that has a first inner chamber;
   a support plate;
   a piston coupled to said support plate, said piston having a flange that is separated from said housing by a gap;
   a diaphragm that is coupled to said piston and said housing, said diaphragm and said flange defining a balancing chamber that is in fluid communication with said first inner chamber through said gap; and,
   a leveling port that is located between said flange and said diaphragm and is in fluid communication with said balancing chamber.

2. The vibration isolator of claim 1, further comprising a leveling valve coupled to said leveling port.

3. The vibration isolator of claim 1, further comprising a cable that is coupled to said piston and said support plate.

4. The vibration isolator of claim 3, wherein said support plate has a support post that moves within a damping fluid located within an inner cavity of said piston.

5. The vibration isolator of claim 1, further comprising a damping element that provides fluid communication between said first inner chamber and a second inner chamber located within said housing.

6. A vibration isolator, comprising:
   a housing that has a first inner chamber;
   a support plate;
   a piston coupled to said support plate, said piston having damping means for damping a movement of said support plate;
   a diaphragm that is coupled to said piston and said housing, said diaphragm and said flange defining a balancing chamber that is in fluid communication with said first inner chamber through said gap; and,
   a leveling port that is located between said diaphragm and said damping means and is in fluid communication with said balancing chamber.

7. The vibration isolator of claim 6, further comprising a leveling valve coupled to said leveling port.

8. The vibration isolator of claim 6, further comprising a cable that is coupled to said piston and said support plate.

9. The vibration isolator of claim 8, wherein said support plate has a support post that moves within a damping fluid located within an inner cavity of said position.

10. The vibration isolator of claim 6, further comprising a damping element that provides fluid communication between said first inner chamber and a second inner chamber located within said housing.

11. A method for leveling a vibration isolator, comprising:
    varying a pressure of a balancing chamber defined by a diaphragm that is coupled to a piston and a housing, and a flange that extends from the piston with a gas introduced through a leveling port located between the flange and the diaphragm, the flange being separated from the housing by a gap that allows a fluid to flow through the gap, the flange providing a force opposite to a movement of the piston.

12. The method of claim 11, wherein the balancing chamber pressure is increased.

13. The method of claim 11, wherein the balancing chamber pressure is decreased.

* * * * *